United States Patent [19]

Chang

[11] 3,851,313

[45] Nov. 26, 1974

[54] MEMORY CELL FOR SEQUENTIALLY ADDRESSED MEMORY ARRAY

[75] Inventor: Kisuk Chang, Houston, Tex.

[73] Assignee: Texas Instruments Incorporated, Dallas, Tex.

[22] Filed: Feb. 21, 1973

[21] Appl. No.: 334,493

[52] U.S. Cl. ..... 340/173 R, 307/221 R, 307/221 C, 340/173 CA

[51] Int. Cl. ... G11c 7/00, G11c 19/00, G11c 11/40

[58] Field of Search ..... 340/173 R, 173 CA, 174 A; 307/238, 221 R, 221 C

[56] References Cited

UNITED STATES PATENTS

| | | | |
|---|---|---|---|
| 2,825,889 | 3/1958 | Henle | 340/166 |
| 3,585,613 | 6/1971 | Palfi | 340/173 CA |
| 3,651,491 | 3/1972 | Kobayashi | 307/238 |
| 3,699,539 | 10/1972 | Spence | 340/173 CA |
| 3,731,287 | 5/1973 | Seely et al. | 340/173 R |
| 3,761,899 | 9/1973 | McKenny et al. | 340/173 CA |

OTHER PUBLICATIONS

Fischer et al. Two-phase Dynamic Shift Register, IBM Technical Disclosure Bulletin, Vol. 14, No. 10, 3/72, pp. 2926 & 2927.

*Primary Examiner*—Stuart N. Hecker
*Attorney, Agent, or Firm*—Harold Levine; Edward J. Connors, Jr.; John G. Graham

[57] ABSTRACT

Disclosed is a sequentially addressed memory array having rows and columns of memory cells with all cells in a respective column having commonly coupled write enable terminals and also commonly coupled read enable terminals. All memory cells in a respective row have read input/write output terminals commonly coupled for providing input information to and output data from the row of cells. A commutator addresses the cells in a periodic and alternate cycle wherein data is respectively read out of one column, written into one of the adjacent columns, read out of the other adjacent column, and finally written into the one column, in sequence.

19 Claims, 5 Drawing Figures

MEMORY CELL FOR SEQUENTIALLY ADDRESSED MEMORY ARRAY

This invention relates to memory systems and methods of addressing memory systems in general and more particularly to a memory system having common input and output lines, and a method of periodically addressing such a system in alternate sequence.

Small electronic calculators of the type implemented in MOS/LSI require a certain capacity of data storage in working registers; the more complex the functions to be provided by the calculator, the more capacity is needed. In the past, these registers were provided by serial shift registers of conventional type; however, a uniquely advantageous manner of implementing the main registers in a calculator MOS chip uses a random access memory which is sequentially addressed, as set forth in copending applications Ser. No. 163,683 and Ser. No. 163,682, both entitled RANDOM ACCESS MEMORY SHIFT REGISTER SYSTEM, Ser. No. 163,565, entitled VARIABLE PROGRAMMED ELECTRONIC CALCULATOR, all filed July 19, 1971, now abandoned, and continued in Ser. No. 420,999 filed Dec. 3, 1974 and Ser. No. 255,856, entitled ELECTRONIC CALCULATOR, filed May 22, 1972 now abandoned, and continued in an application filed in Feb., 1974, all such applications being assigned to the assignee of this application.

The sequentially addressed memory (SAM) systems disclosed in the prior applications are of the type having rows and columns of memory cells with each cell having read, write, read enable, and write enable terminals, i.e., random access type cells are used rather than shift register type cells. Different schemes of addressing the array and different configurations employing commoning of electrodes in sequentially addressed memory arrays have been utilized. For example, all read enable terminals of cells in a column may be commonly coupled, or all write enable cells in a column may be commoned; also, all write input terminals of cells in a row or all read output terminals in a row may be commoned. The memory arrays of said prior applications provide a commutator for sequentially addressing columns of cells in the sequence read column 1, write column 1, read column 2, write column 2, read column 3, etc. In one disclosed embodiment, read enable terminals of one column have been commonly coupled with write enable terminals of the adjacent column. These embodiments of sequentially addressed random access memory arrays, as described in detail in said prior applications, have found great utility in MOS/LSI calculator systems.

The demand for small, pocket-sized calculators utilizing integrated circuit arrays has necessitated optimum utilization of semiconductor chip area for both decreasing calculator size and minimizing manufacturing expense. The sequentially addressed memory arrays above (SAM's)have shown generally to provide an improvement in required chip area over prior shift register embodiments providing similar functions. However, prior sequentially addressed arrays have utilized an individual memory cell designed in a rectangular layout for ease in providing cell interconnection, functional cell timing relationships and in meeting MOS design specifications in general. However, due to the need for larger arrays demanded by more complex calculator systems requiring, for example, 16 digit, 10 register arrays as in a programmable scientific calculator, the rectangular cell layout has proven to be awkward in allowing large arrays with optimum chip area utilization. A cell providing a substantially square layout, or at least shorter in the vertical direction, with smallest possible dimensions was desired.

It is accordingly an object of the present invention to provide an MOS SAM comprising a memory cell of substantially square dimensioned layout.

It is another object to provide a SAM having a substantially square cell layout which is compatible in a complex electronic system.

It is yet a further object of the invention to provide a SAM having a substantially square cell which is compatible with recirculate, right shift, input, output, and enabling control means.

It is another object of the invention to provide a method of periodically addressing a SAM having a substantially square cell layout.

These and other objects are accomplished in accordance with the present invention by utilizing a random access memory array coupled to and operated in response to a commutator system for addressing columns of the array periodically and in an alternate sequence. The memory array comprises rows and columns of memory cells having read, write, read enable, and write enable terminals with respective columns of cells having commonly coupled read enable terminals and commonly coupled write enable terminals and respective rows of cells having commonly coupled write input and read output terminals. The commutator system periodically provides pulses to the read enable and write enable line non-sequentially so that a single read/write line coupling the read and write terminals may be utilized. The read/write lines are preferably precharged before each read or write cycle. Recirculate means and right shift means selectively delay and re-enter output data onto the read/write line so as to provide right shifting and recirculating functions.

Other features and advantages of the invention will be apparent from the following detailed description and claims, and from the accompanying drawings wherein:

FIG. 1 schematically depicts a memory array in accordance with an embodiment of this invention;

FIG. 2 depicts a timing diagram for the embodiment of FIG. 1;

FIG. 3 pictorially illustrates a semiconductor integrated circuit implementation of one embodiment; and FIGS. 4A and 4B illustrate a cross-sectional view of the integrated circuit of FIG. 3.

REferring to FIG. 1, a sequentially addressed memory array is illustrated which employs the features of the invention. The array comprises four rows by four columns of identical memory cells 1, each of which includes an input transistor 2, an output transistor 3, and a storage device 4. The capacitance of the gate of the MOS transistor device 4 acts as the memory element in conventional manner. The memory cells 1 are functionally similar to the widely used three device MOS memory cells employed in RAM's or random access memories. An important feature of the invention is that with all cells in respective columns having commoned read enable terminals and commoned write enable terminals, both the input and output transistors 2 and 3 of every cell in a respective column are connected to a common input/output line. The array of FIG. 1 has four such read/write or input/output lines, labeled I/O A, I/O B, I/O C, and I/O D, corresponding to rows A, B, C, and D. As above indicated, each of the four columns labeled column I to column IV of the array includes a write enable or input address line 5, 6, 7 or 8, as well as a read enable or output address line 11, 12, 13 or 14, respectively. It will be understood, of course, tha the illustration of a sixteen bit or four-by-four array is merely for simplicity and the invention would find its greatest practical utility in large arrays; for example, an array of sixteen bits per row by forty rows, or six hundred forty bits, is used in an MOS chip for a business-type calculator, providing ten binary-coded-decimal registers of sixteen digits each. The address lines 5-8, 11-14 are dirven in a particular order by a sequential address commutator which includes a ring counter 15, shown to include four stages, which counts sequentially in the order $S_1$-$S_2$-$S_3$-$S_4$-$S_1$-$S_2$. . . The number of S-times in one complete period, $S_1$-$S_j$, corresponds to an array having $j$ columns, the array above depicted having four columns, i.e., $j = 4$. A positive logic one is circulated in counter 15 meaning that all of the ring counter output lines 16 will be at a logic zero at any one time, except one which will be at logic one.

A set of logic gates 17 is responsive to the outputs $S_1$–$S_4$ of the commutator 15 and to multiphase clock generator signals $\bar{\phi}_1$ and $\bar{\phi}_2$. Gates 17, in response to the clock signals and signals $S_1$–$S_4$, address or actuate the read enable and write enable lines of the respecitve columns in a periodic and alternate sequence as will be explained hereafter. Precharge means 54 is provided comprising gate 19 and transistors 18 selectively coupling course $V_{DD}$ to the read/write lines I/O A, I/O B, I/O C, and I/O D.

As seen in FIG. 2A, the basic timing of the system is four phase with the clock signals representing the four phases labeled $\phi_1$, $P_1$, $\phi_2$, and $P_2$. A set of four phases or clocks $\phi_1$, $P_1$, $\phi_2$, $P_2$ constitutes one cycle or one state time, S-time, which is sequentially repeated.

Figure 1:
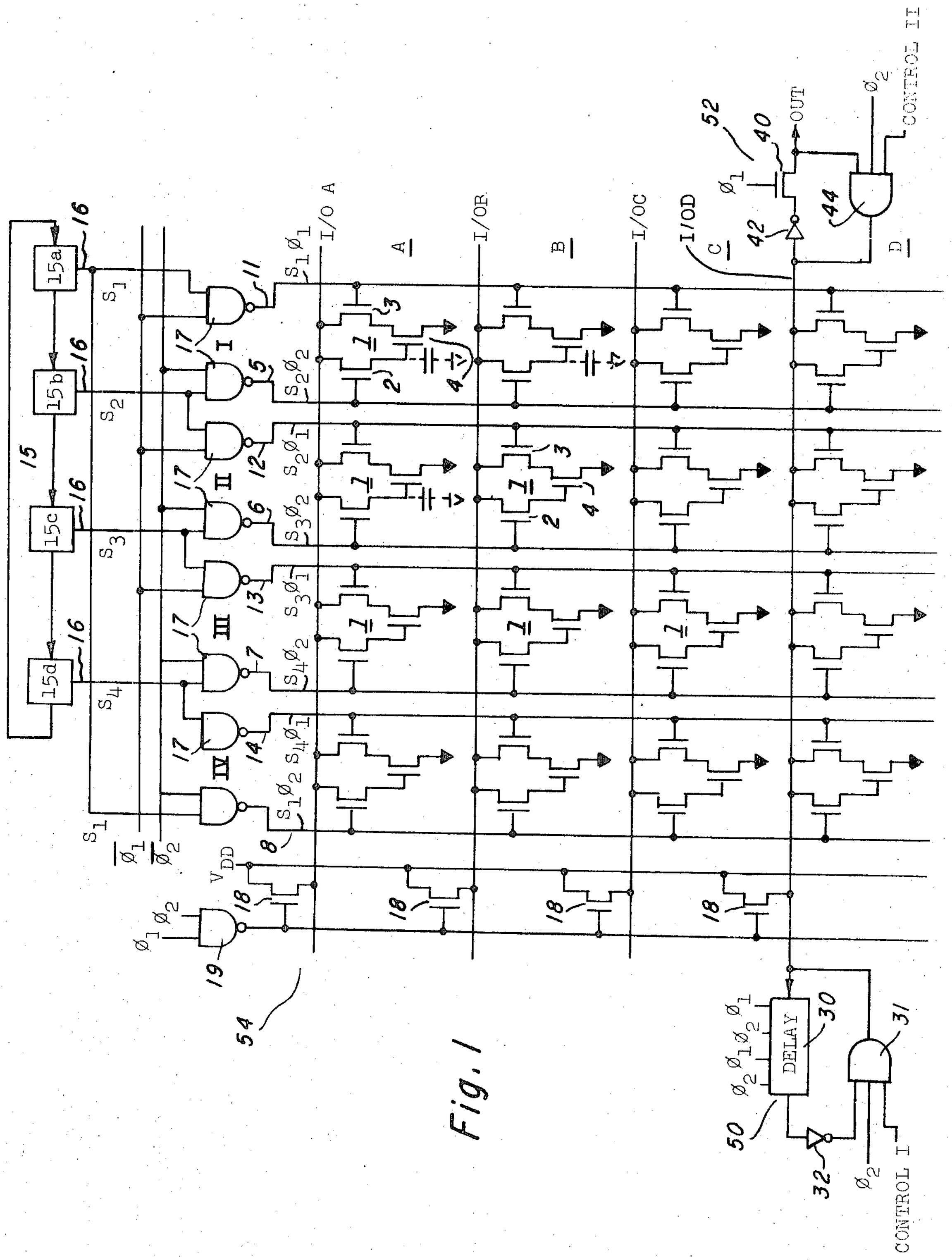
Figure 2:
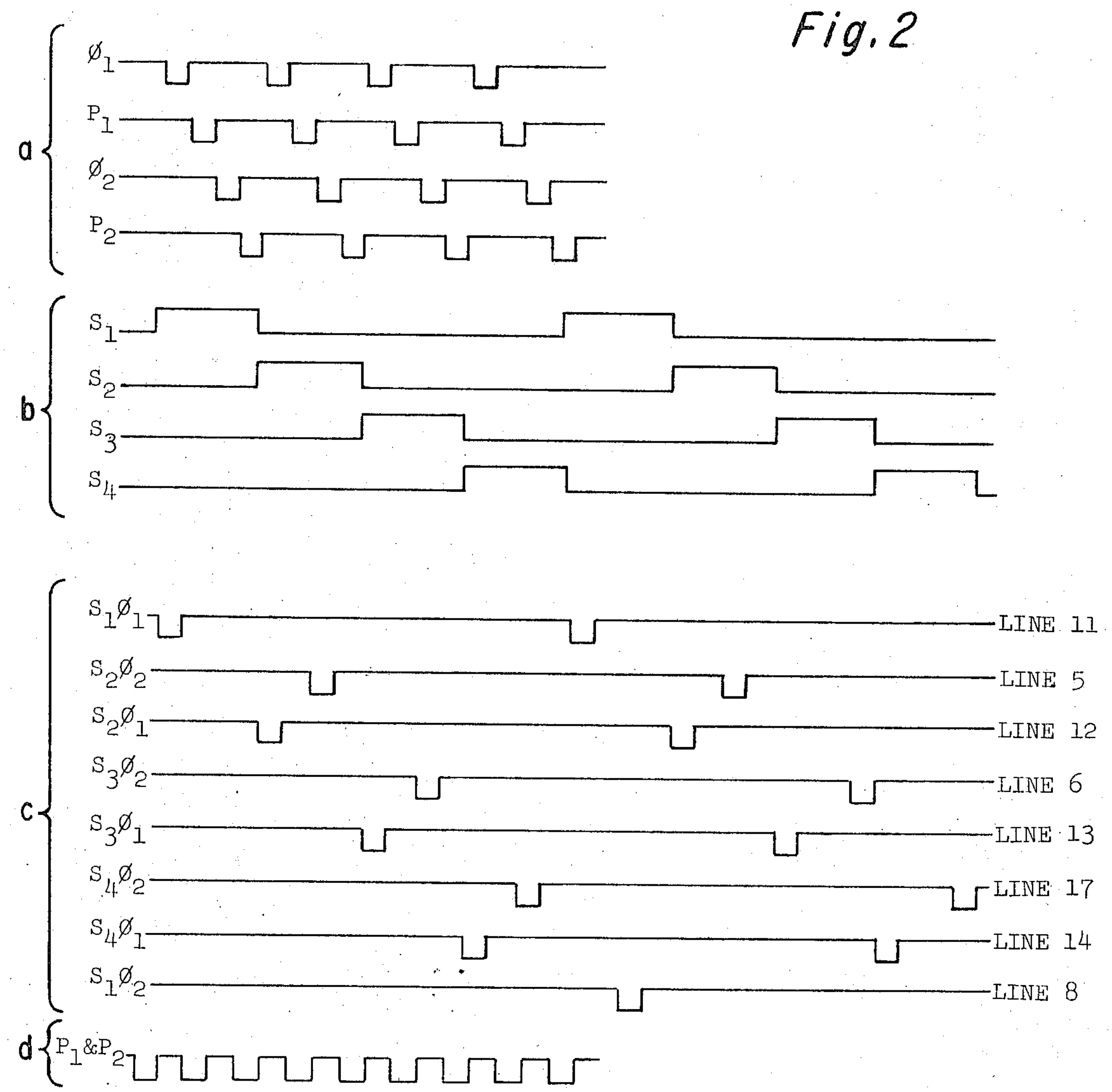
FIG. 2B depicts state times $S_1$, $S_2$, $S_3$ and $S_4$ showing the relative relationship between the state times and the four phase signals which are each mutually exclusive during the respective S-time.
FIG. 2D shows the logic OR combination of signals $P_1$ and $P_2$ which drive the precharging circuitry 54 of FIG. 1 wherein the respective read/write input/output lines of the various rows are simultaneously precharged prior to $\phi_1$ and $\phi_2$ times.

Basic operation of the sequentially addressed memory array of FIG. 1 is best understood when viewing the logic output timing diagrams depicted in FIG. 2C. Immediately prior to time State 1-$\phi_1$ or $S_1\phi_1$, all read/write lines in rows A–D are simultaneously precharged by the precharge gating means comprising a positive logic NAND gate 19 responsive to clock signals $\phi_1$ and $\phi_2$ for actuating transistor 18. Upon actuation, transistors 18 selectively and periodically couple supply voltage $V_{DD}$ to each of the read/write lines to thereby charge inherent line capacitance. It is observed that the positive logic NAND combination of clock signals $\phi_1$ and $\phi_2$ provides a negative logic output signal logically characterized as $P_1 + P_2$ as shown in FIG. 2D.

After precharging the read/write lines of rows A–D to a logic one, the logic means 17 addresses the read enable line 11 at times $S_1\phi_1$, parenthetically depicted for convenience. To generate the negative logic pulses on the read and write lines, the state time pulses $S_1$–$S_4$ which are generated in positive logic by circulating a positive logic one in commutator 15 are logically NAND combined by gates 17 in negative logic. Upon the occurrence of signal $S_1\phi_1$, read transistors 3 in column I become conductive causing the contents of each storage device 4 in column I to be read onto the read/write line of the respective row. During this phase of the cycle, the read/write line is utilized as a read output line which may be coupled through control circuitry, for example, to an arithmetic logic unit in an electronic calculator. However, as will be later explained, the read output may be delayed for a selected period and thereafter reimpressed upon the respective read/write line wherein it is written into a selected cell at an S-$\phi_2$ time.

After the data has been read out of the specific cell and communicated, the read/write line is recharged at time $S_1$ $P_1$. Then at time $S_1\phi_2$ the write enable line 8 is actuated and the read/write line functions as a write line to input data to the storage device 4 through write transistor 2. Operation of the basic memory cell comprising transistors 2, 3 and 4 is explained in detail in the above referenced copending patent application, RANDOM ACCESS MEMORY SHIFT REGISTER SYSTEM. At time $S_1P_2$ after data has been written into the memory cell, the respective read/write lines are recharged ready for the second state time $S_2$.

Omitting the precharge phases in each cycle for the sake of convenience, at $S_2\phi_1$ the read enable line 12 of column II is actuated and data is read out of column II onto the respective read/write lines. At $S_2\phi_2$ the write enable line 5 of column I is activated and data is written into the respective cell in column I from the respective read/write line. At time $S_3\phi_1$ the read enable line 13 of column III is actuated causing the data in the respective cell in column III to be read onto the read/write line. Then to complete the cycle beginning with addressing the read enable line 12 in column II, at time $S_3\phi_2$ data is written into cells in column II from the respective read/write line. This general overlapping pattern is repeated to actuate all columns of the arrays. The pattern is seen to be overlapping in that as the commutator addresses the columns in one direction, the actual sequencing of read/write enabling lines of adjacent columns is periodically at times in the other direction. That is, addressing the array is characterized by the steps of addressing one column of read enable terminals for reading information from the cells of the one column onto the respective read/write means, thereafter addressing the write enable terminals of one adjacent column to write into the one adjacent column from the read/write line, then addressing the read enable terminals of the other adjacent column to read onto the read/write line the contents of the cells of the other column, and finally addressing the write enable terminals of the one column to thereby write into each cell of the one column from the respective read/write line.

A complete detailed analysis of the functioning of the memory array is set forth in timed sequence in the table below. Depicted therein are rows A, B, C and D respectively grouped according to columns I, II, III, IV. The contents of the read/write line are represented by I XY/OY.

| t: | S1 | | | | S2 | | | | S3 | | | | S4 | | | |
|---|---|---|---|---|---|---|---|---|---|---|---|---|---|---|---|---|
| | $\phi_1$ | $P_1$ | $\phi_2$ | $P_2$ | $\phi_1$ | $P_1$ | $\phi_2$ | $P_2$ | $\phi_1$ | $P_1$ | $\phi_2$ | $P_2$ | $\phi_1$ | $P_1$ | $\phi_2$ | $P_2$ |
| A I | — | — | — | — | — | — | a2 | a2 | a2 | a2 | a2 | a2 | a2 | a2 | a2 | a2 |
| B I | — | — | — | — | — | — | b2 | b2 | b2 | b2 | b2 | b2 | b2 | b2 | b2 | b2 |
| C I | — | — | — | — | — | — | c2 | c2 | c2 | c2 | c2 | c2 | c2 | c2 | c2 | c2 |
| D I | — | — | — | — | — | — | d2 | d2 | d2 | d2 | d2 | d2 | d2 | d2 | d2 | d2 |
| A II | — | — | — | — | — | — | — | — | — | — | a3 | a3 | a3 | a3 | a3 | a3 |
| B II | — | — | — | — | — | — | — | — | — | — | b3 | b3 | b3 | b3 | b3 | b3 |
| C II | — | — | — | — | — | — | — | — | — | — | c3 | c3 | c3 | c3 | c3 | c3 |
| D II | — | — | — | — | — | — | — | — | — | — | d3 | d3 | d3 | d3 | d3 | d3 |
| A III | — | — | — | — | — | — | — | — | — | — | — | — | — | — | a4 | a4 |
| B III | — | — | — | — | — | — | — | — | — | — | — | — | — | — | b4 | b4 |
| C III | — | — | — | — | — | — | — | — | — | — | — | — | — | — | c4 | c4 |
| D III | — | — | — | — | — | — | — | — | — | — | — | — | — | — | d4 | d4 |
| A IV | — | — | a1 | a1 | a1 | a1 | a1 | a1 | a1 | a1 | a1 | a1 | a1 | a1 | a1 | a1 |
| B IV | — | — | b1 | b1 | b1 | b1 | b1 | b1 | b1 | b1 | b1 | b1 | b1 | b1 | b1 | b1 |
| C IV | — | — | c1 | c1 | c1 | c1 | c1 | c1 | c1 | c1 | c1 | c1 | c1 | c1 | c1 | c1 |
| D IV | — | — | d1 | d1 | d1 | d1 | d1 | d1 | d1 | d1 | d1 | d1 | d1 | d1 | d1 | d1 |
| IA/OA | /φ | P | a1/ | P | /φ | P | a2/ | P | /φ | P | a3/ | P | /a1 | P | a4/ | P |
| IB/OB | /φ | P | b1/ | P | /φ | P | b2/ | P | /φ | P | b3/ | P | /b1 | P | b4/ | P |
| IC/OC | /φ | P | c1/ | P | /φ | P | c2/ | P | /φ | P | c3/ | P | /c1 | P | c4/ | P |
| ID/OD | /φ | P | d1/ | P | /φ | P | d2/ | P | / | P | d3/ | P | /d1 | P | d4/ | P |
| S1 | 1 | 1 | 1 | 1 | 0 | 0 | 0 | 0 | 0 | 0 | 0 | 0 | 0 | 0 | 0 | 0 |
| S2 | 0 | 0 | 0 | 0 | 1 | 1 | 1 | 1 | 0 | 0 | 0 | 0 | 0 | 0 | 0 | 0 |
| S3 | 0 | 0 | 0 | 0 | 0 | 0 | 0 | 0 | 1 | 1 | 1 | 1 | 0 | 0 | 0 | 0 |
| S4 | 0 | 0 | 0 | 0 | 0 | 0 | 0 | 0 | 0 | 0 | 0 | 0 | 1 | 1 | 1 | 1 |
| A I | a2 | a2 | a2 | a2 | a2 | a2 | a6 | a6 | a6 | a6 | a6 | a6 | a6 | a6 | a6 | a6 |
| B I | b2 | b2 | b2 | b2 | b2 | b2 | b6 | b6 | b6 | b6 | b6 | b6 | b6 | b6 | b6 | b6 |
| C I | c2 | c2 | c2 | c2 | c2 | c2 | c6 | c6 | c6 | c6 | c6 | c6 | c6 | c6 | c6 | c6 |
| D I | d2 | d2 | d2 | d2 | d2 | d2 | d6 | d6 | d6 | d6 | d6 | d6 | d6 | d6 | d6 | d6 |
| A II | a3 | a3 | a3 | a3 | a3 | a3 | a3 | a3 | a3 | a3 | a7 | a7 | a7 | a7 | a7 | a7 |
| B II | b3 | b3 | b3 | b3 | b3 | b3 | b3 | b3 | b3 | b3 | b7 | b7 | b7 | b7 | b7 | b7 |
| C II | c3 | c3 | c3 | c3 | c3 | c3 | c3 | c3 | c3 | c3 | c7 | c7 | c7 | c7 | c7 | c7 |
| D II | d3 | d3 | d3 | d3 | d3 | d3 | d3 | d3 | d3 | d3 | d7 | d7 | d7 | d7 | d7 | d7 |
| A III | a4 | a4 | a4 | a4 | a4 | a4 | a4 | a4 | a4 | a4 | a4 | a4 | a4 | a4 | a8 | a8 |
| B III | b4 | b4 | b4 | b4 | b4 | b4 | b4 | b4 | b4 | b4 | b4 | b4 | b4 | b4 | b8 | b8 |
| C III | c4 | c4 | c4 | c4 | c4 | c4 | c4 | c4 | c4 | c4 | c4 | c4 | c4 | c4 | c8 | c8 |
| D III | d4 | d4 | d4 | d4 | d4 | d4 | d4 | d4 | d4 | d4 | d4 | d4 | d4 | d4 | d8 | d8 |
| A IV | a1 | a1 | a5 | a5 | a5 | a5 | a5 | a5 | a5 | a5 | a5 | a5 | a5 | a5 | a5 | a5 |
| B IV | b1 | b1 | b5 | b5 | b5 | b5 | b5 | b5 | b5 | b5 | b5 | b5 | b5 | b5 | b5 | b5 |
| C IV | c1 | c1 | c5 | c5 | c5 | c5 | c5 | c5 | c5 | c5 | c5 | c5 | c5 | c5 | c5 | d5 |
| D IV | d1 | d1 | d5 | d5 | d5 | d5 | d5 | d5 | d5 | d5 | d5 | d5 | d5 | d5 | d5 | d5 |
| IA/OA | /a2 | P | a5/ | P | /a3 | P | a6/ | P | /a4 | P | a7/ | P | /a5 | P | a8/ | P |
| IB/OB | /b2 | P | b5/ | P | /b3 | P | b6/ | P | /b4 | P | b7/ | P | /b5 | P | b8/ | P |
| TC/OC | /c2 | P | c5/ | P | /c3 | P | c6/ | P | /c4 | P | c7/ | P | /c5 | P | c8/ | P |
| ID/OD | /d2 | P | d5/ | P | /d3 | P | d6/ | P | /d4 | P | d7/ | P | /d5 | P | d8/ | P |
| S1 | 1 | 1 | 1 | 1 | 0 | 0 | 0 | 0 | 0 | 0 | 0 | 0 | 0 | 0 | 0 | 0 |
| S2 | 0 | 0 | 0 | 0 | 1 | 1 | 1 | 1 | 0 | 0 | 0 | 0 | 0 | 0 | 0 | 0 |
| S3 | 0 | 0 | 0 | 0 | 0 | 0 | 0 | 0 | 1 | 1 | 1 | 1 | 0 | 0 | 0 | 0 |
| S4 | 0 | 0 | 0 | 0 | 0 | 0 | 0 | 0 | 0 | 0 | 0 | 0 | 1 | 1 | 1 | 1 |
| A I | a6 | a6 | a6 | a6 | | | | | | | | | | | | |
| B I | b6 | b6 | b6 | b6 | | | | | | | | | | | | |
| C I | c6 | c6 | c6 | c6 | | | | | | | | | | | | |
| D I | d6 | d6 | d6 | d6 | | | | | | | | | | | | |
| A II | a7 | a7 | a7 | a7 | | | | | | | | | | | | |
| B II | b7 | b7 | b7 | b7 | | | | | | | | | | | | |
| C II | c7 | c7 | c7 | c7 | | | | | | | | | | | | |
| D II | d7 | d7 | d7 | d7 | | | | | | | | | | | | |
| A III | a8 | a8 | a8 | a8 | | | | | | | | | | | | |
| B III | b8 | b8 | b8 | b8 | | | | | | | | | | | | |
| C III | c8 | c8 | c8 | c8 | | | | | | | | | | | | |
| D III | d8 | d8 | d8 | d8 | | | | | | | | | | | | |
| A IV | a5 | a5 | a9 | a9 | | | | | | | | | | | | |
| B IV | b5 | b5 | b9 | b9 | | | | | | | | | | | | |
| C IV | c5 | c5 | c9 | c9 | | | | | | | | | | | | |
| D IV | d5 | d5 | d9 | d9 | | | | | | | | | | | | |
| IA/OA | /a6 | P | a9/ | P | | | | | | | | | | | | |
| IB/OB | /b6 | P | b9/ | P | | | | | | | | | | | | |
| IC/OC | /c6 | P | c9/ | P | | | | | | | | | | | | |
| ID/OD | /d6 | P | d9/ | P | | | | | | | | | | | | |
| S1 | 1 | 1 | 1 | 1 | | | | | | | | | | | | |
| S2 | 0 | 0 | 0 | 0 | | | | | | | | | | | | |
| S3 | 0 | 0 | 0 | 0 | | | | | | | | | | | | |
| S4 | 0 | 0 | 0 | 0 | | | | | | | | | | | | |

P = precharge
— = empty cell
φ = output from an empty cell

I designates input and O designates output and the appropriate row designation Y immediately suffixes the I and O designation. Furthermore, whether the common read/write means is utilized as an input or an output is represented by depicting the information on the line either to the left or the right of the slash mark; that is $\phi/$ indicates an input of $\phi$ and $/\phi$ represents an output of $\phi$. Logic state of the respective state times S are shown in relation to the clock signals $\phi$ and P. Specifically, for example, at time $S_2\phi_2$ data a2 is input to the cell defined by the coordinates row A, column I. Likewise at time $S_4\phi_1$ data a1 is read out of the row A, column IV cell as an output on the A read/write line I/OA.

Referring again now to FIG. 1, shown is a recirculate circuit 50 wherein data read out of one cell in a row is delayed for a selected period and then reimpressed on the same read/write line to be rewritten back into the same cell. That is, if the output from one cell in a row is delayed by a delay means 30 for one and one-half state times and then reimpressed upon the read/write line at the next $\phi_2$ clock time, then the data is read back into the one cell from which it originated. It is readily seen that data raad out of a cell is in false negative logic so it must be converted to true negative logic before being written back into the cell. A recirculate cycle may be seen specifically be referring to the table at time $S_2\phi_1$ at the row A, column II cell, A II, where the *a*3 data is read out of that cell onto the A read/write line. One and one-half state times later at time $S_3\phi_2$, imposing the condition that *a*7 equals *a*3 as the *a*3 data is reimpressed on the read/write line, it is seen that the data read out at time $S_2\phi_1$ is written back in at time $S_3\phi_2$.

Delay means 30 preferably comprises a shift register stage responsive to a series of $\phi_1$-$\phi_2$-$\phi_1$-$\phi_2$ clocking signals to provide the one and one-half state time delay. Inverter 31 converts the signal from false negative logic to true logic, and gate 32 selectively recouples or reimpresses the signal during the $\phi_2$ phase in response to the control I signal. The control I signal represents a system control signal generated to enable the recirculate function only during the proper time. That is, the recirculate function must be mutually exclusive from the input, output and right shift function, explained hereafter. By choosing the appropriate delay, data read out of one cell may be written into any other cell in the respective row in the embodiment of FIG. 1.

Also depicted in FIG. 1 is a right shift means 52 comprising inverter 42, gate 40, and logic gate 44. The sequence of addressing the columns of cells is ideally suited for right shifting data in a row with minimal delay. As is seen from the table, data is read out of a cell on the $\phi_1$ clock. It is then inverted by inverter 42 and passes through gate 40 awaiting clock $\phi_2$ which occurs a one-half state time later. The inverter 42 is utilized because data is stored in the memory cells in true negative logic and is read out onto the read/write line as false negative logic. Upon the $\phi_2$ clock signal, the output data to be right shifted is then written back onto the respective read/write line through gate 44 in response to system control signal II, as earlier noted. Right shift, input, output, and recirculate functions are mutually exclusive, and control signal II provides the appropriate timing for the right shift stage and data is written into the appropriate cell. A right shift sequence is seen when referring to the table, for example, at time $S_2\phi_1$ wherein data *a*3 is read out of the row A, column II cell and at time $S_2\phi_2$ is read into cell row A, column I (data *a*6 is data *a*3). Furthermore, by choosing other appropriate delays, data may be right shifted in a column any particular number of cells.

Figure 3:
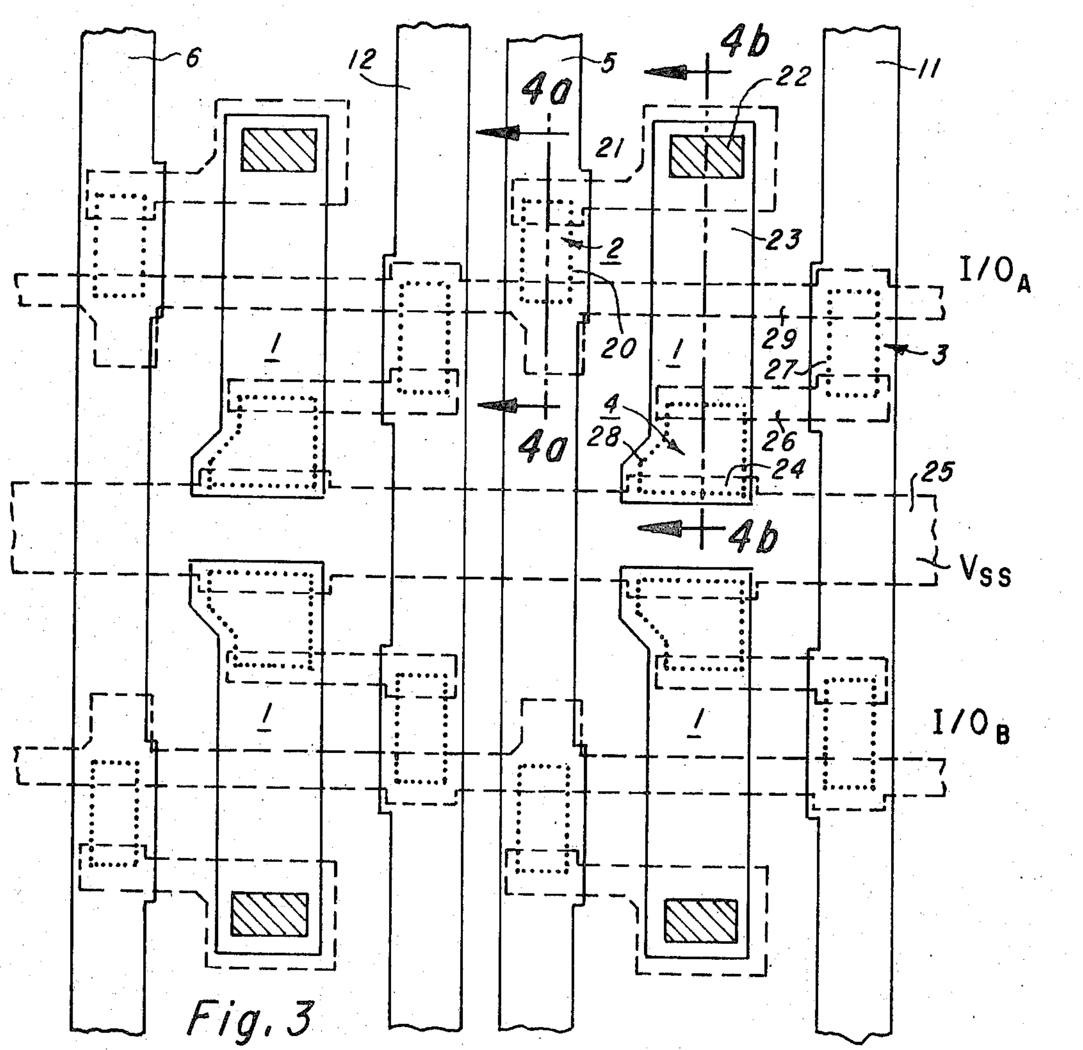

Referring now to FIG. 3, a preferable MOS integrated circuit layout for the memory cell utilizing this invention is shown. Four of the cells 1 are depicted with transistors 2, 3 and 4 enumerated. In a P-channel enhancement type MOS mode, P-type diffused regions in the N-type substrate are shown as dashed lines, metallization is shown as solid lines, gate or thin oxide regions are shown with dotted lines, and connections between P-diffused regions and overlying metal connections are shown with diagonal lines, with thick or field oxide in all other areas. A cell 1 includes a write address line 5 comprising a strip of metal film with a gate 20 defined by an area of thin oxide beneath the metal film for the input transistor 2. The drain 21 of the transistor 2 is provided by a P-diffused region extending to a contact 22 wherein connection is made between the drain of transistor 2 and a metal film 23 forming the gate connection to transistor 4. The metal film 23 also provides part of the required storage capacitance essential to operation of the cell. The source 24 of the transistor 4 is provided by part of an elongated P-diffused region 25, and the drain of transistor 4 is provided by a P-type region 26 which also provides the source of transistor 3. The gates of transistors 3 and 4 are defined by thin oxide areas 27 and 28. The read/write line A is defined by a P-type diffused region 29 providing source or drain regions for the transistors 2 and 3. The read enable address line 11 is provided by a metal strip. The entire cell 1 including its three transistors, storage capacitance, read/write line, two address enable lines, and reference potential $V_{DD}$ is provided in a square-shaped area approximating 3 mils × 3 mils. Cells in rows A and B share a common $V_{DD}$ region 25 with the consequence that the lower cell is a mirror image of the upper cell.

Figure 4A:
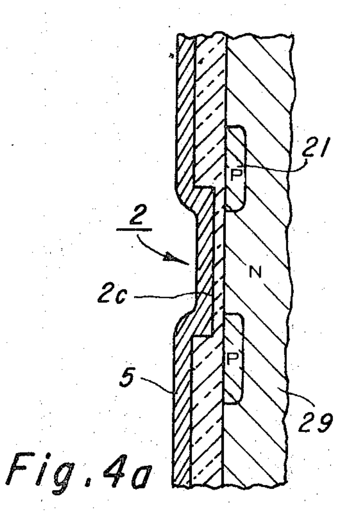

FIG. 4A is a cross-sectional view of the integrated circuit of FIG. 3 taken along the view 4A—4A. Specifically illustrated is the gate 20 for the input transistor 2 wherein the write enable line 5 overlies the thin gate oxide region overlying the channel between the P-type pockets.

Figure 4B:
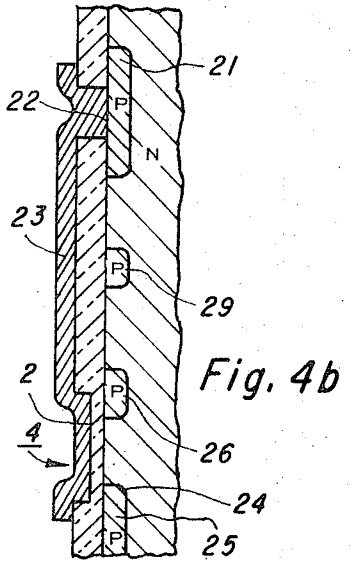

FIG. 4B depicts a cross-sectional view of the integrated circuit of FIG. 3 taken along the view 4B—4B. Specifically illustrated is the relatively large metal film 23 which provides the storage capacitance for the storage transistor 4. The metal layer 23 is shown contacting at 22 the P-type drain 21 of transistor 2, crossing over $V_{DD}$ voltage line $V_{DD}$ utilizing a thick oxide region, and thereafter forming the gate of transistor 4 overlying the thin oxide between source and drain regions 24 and 26, respectively.

The above described MOS integrated circuit may be provided using contemporary MOS process techniques such as, but not limited to, diffusion and/or ion implantation processes and E-beam mask forming techniques.

The above described sequentially addressed memory array and method of operation utilizing a cell design having substantially square layout is most advantageously utilized in systems requiring large memory arrays. As is well known in integrated circuit technology, maximum chip yield is achieved when the chip size does not exceed certain known limits. Large scale arrays utilizing cells of elongated layout tend to increase chip size and to limit the size of the memory array. The substantially square layout of this design and utilization of common read/write lines for cells in respective rows has proven to optimize array size per chip area, particularly in an array of ten BCD registers as mentioned above. Furthermore, the method herein described of addressing the read and write enable lines of the respective columns of cells has proven to be advantageously adapted for recirculate and right shift functions, which are essential functions in LSI calculator systems.

Although specific embodiments of this invention have been described herein, in conjunction with a specific MOS P-channel implementation of the memory cell, various modifications to the structure such as utilizing N-channel MOS is understood. Likewise, various modifications to the specific method of addressing the read enable and write enable lines such as by varying the length of delay in the recirculate and right shift circuitry will be apparent to those skilled in the art without departing from the scope of this invention.

What is claimed is:

1. The method of addressing an array of selectively addressable memory cells arranged in rows and columns with all cells in a respective column having common write enable terminals and common read enable terminals and all cells in respective rows having common read input terminals and common write output terminals commonly coupled by a read/write means, comprising the steps of:

a. addressing one column of read enable terminals for reading information from the cells of said one column onto the respective read/write means;

b. addressing the write enable terminals of the right adjacent column to thereby write into said right adjacent column from said read/write means;

c. addressing the read enable terminals of the left adjacent column to thereby read onto the read/write means the contents of the cells of said other column; and d. addressing the write enable terminals of said one column to thereby write into each cell of said each column from the respective read/write means.

2. The method of addressing according to claim 1 and further including precharging said read/write means immediately prior to each of said steps of addressing.

3. The method according to claim 2 wherein a sequence of steps consisting of precharging the read/write lines, addressing a column of read terminals, precharging the read/write lines, and addressing the write enable columns, comprises one state time and said step of addressing one column of read enable terminals includes the steps of:

a. delaying said information one and one-half state time; and thereafter b. impressing said information onto said read/write means to thereby recirculate said information.

4. The method according to claim 2 wherein a sequency of steps consisting of precharging the read/write lines, addressing a column of read terminals, precharging the read/write lines, and addressing the write enable columns, comprises one state time and said step of addressing one column of read enable terminals includes:

a. delaying said information one and one-half state times; and thereafter b. impressing said information onto said read/write means to thereby right shift said information.

5. In a memory system: a plurality of identical memory cells arranged in an array of rows and columns; each memory cell comprising a data input terminal, a data output terminal, capacitve data storing means, a reference potential source, and first, second and third switching devices each having an output circuit and a control terminal, the output circuits of the first and second switching devices being connected in series between said potential source and the data output terminal, the capacitive data storing means being connected between the potential source and the control terminal of the first switching device, the output circuit of the third switching device being connected between the data input terminal and the control terminal of the first switching device, the data input terminal and data output terminal being directly connected together and coupled to data input/output means; means connecting the data input/output means of each separate row of the cells in common; first address means connecting the control terminals of all of the second switching devices of each separate column of cells in common; second address means connecting the control terminals of all of the third switching devices of each separate column in common; and means for actuating the first and second address means in an ordered sequence wherein the columns are addressed in overlapping manner by actuating the second address means of a given column, then actuating the first address means of the preceding column, then actuating the second address means of the succeeding column, then actuating the first address means of said given column.

6. A memory system according to claim 5 wherein the means for actuating the address means functions to actuate only one of the address means on only one column in the array at any given time.

7. A memory system according to claim 5 wherein the first, second and third switching devices are MOS transistors, wherein the array is in the form of an integrated semiconductor chip, wherein the data input and data output terminals are connected together by elongated regions of semiconductor material in the semiconductor chip, and wherein the first and second address means comprises metal film strips on the semiconductor chip.

8. A memory system according to claim 7 and including left shift and right shift delay means provided on the chip for coupling the data input and data output terminals of each row to provide time delayed reinsertion of bits read out of a given cell.

9. A selectively addressable memory system comprising:

a. a random access memory array having rows and columns of selectively addressable memory cells having read, write, read enable, and write enable terminals with all read enable terminals in a respective column commonly coupled, and all write enable terminals in a respective column commonly coupled, all read terminals in a respective row commonly coupled, and all write terminals in a respective row commonly coupled;

b. means commonly coupling said read and write terminals for selectively conveying input and output data to and from said cells; and c. commutator means for cyclically addressing individual columns in an ordered bidirectional sequence.

10. The memory system of claim 9 wherein said commutator means includes periodically addressing means for, in sequence, read enable terminals of one column, write enable terminals of one adjacent column, and read enable terminals of the other adjacent column and write enable terminals of said one column, respectively.

11. The memory system of claim 9 wherein said input and output data means commonly connects said read and said write terminals.

12. The memory system of claim 11 wherein said commutator means includes:

a. a multiphase signal generator providing a multiphase signal, said phase representing a state time; and b. logic means responsive to said signal generator for selectively addressing columns of said read and write enable terminals individually and alternately.

13. The memory system of claim 12 wherein said signal generator provides said multi-phase signal having phases equal in number to the number of said columns, wherein each of said phases consists of a logic one signal interval and a logic zero signal interval and said logic one level represents a state time.

14. The memory system of claim 13 wherein said first plurality of phased clock signals comprises two signals, occurring in a period of one state time.

15. The memory system of claim 12 wherein said logic means is further responsive to a first plurality of phased clock signals.

16. The memory system of claim 15 and further including means responsive to a second plurality of phased clock signals for selectively precharging said read and write means.

17. The memory system of claim 16 and further including recirculate means comprising a signal delay means of one and one-half state times responsive to one of said second plurality of clock signals for rewriting said output data into the respective cells from which it was read.

18. The memory system of claim 17 and further including right shift means responsive to one of said second plurality of phased clock signals for right shifting said output signals from one column into the adjacent column.

19. The memory system of claim 18 wherein said right shift means comprises a signal delay means of one-half state time.

* * * * *